(12) United States Patent
Randerath et al.

(10) Patent No.: US 9,321,543 B2
(45) Date of Patent: Apr. 26, 2016

(54) METHOD AND DEVICE FOR CONDITION MONITORING

(75) Inventors: Bernhard Randerath, Wegberg (DE); Mike Gerdes, Hamburg (DE); Dieter Scholz, Neu Wulmstorf (DE)

(73) Assignee: Airbus Operations GMBH, Hamburg (DE)

( * ) Notice: Subject to any disclaimer, the term of this patent is extended or adjusted under 35 U.S.C. 154(b) by 160 days.

(21) Appl. No.: 14/119,529

(22) PCT Filed: May 30, 2012

(86) PCT No.: PCT/EP2012/060182
§ 371 (c)(1),
(2), (4) Date: Feb. 27, 2014

(87) PCT Pub. No.: WO2012/163985
PCT Pub. Date: Dec. 6, 2012

(65) Prior Publication Data
US 2014/0163812 A1    Jun. 12, 2014

Related U.S. Application Data

(60) Provisional application No. 61/491,407, filed on May 31, 2011.

(30) Foreign Application Priority Data

May 31, 2011 (DE) .......................... 10 2011 076 780

(51) Int. Cl.
*B64F 5/00* (2006.01)
*G05B 23/02* (2006.01)

(52) U.S. Cl.
CPC ............ *B64F 5/0045* (2013.01); *G05B 23/024* (2013.01)

(58) Field of Classification Search
CPC .......................... B64F 5/0045; G05B 23/024
USPC ...................................................... 701/32.9
See application file for complete search history.

(56) References Cited

U.S. PATENT DOCUMENTS 6,687,640 B1 * 2/2004 Gelbard ............... F24F 11/006
454/229
6,871,201 B2   3/2005 Yu et al.
(Continued)

FOREIGN PATENT DOCUMENTS

CA    2524735      10/2005
CN    1204435 A    1/1999
(Continued)

OTHER PUBLICATIONS

German Office Action, Jan. 25, 2012.
(Continued)

*Primary Examiner* — Jerrah Edwards
*Assistant Examiner* — Frederick Brushaber
(74) *Attorney, Agent, or Firm* — Greer, Burns & Crain, Ltd.

(57) ABSTRACT

A computer-implemented method, a computer program product and a device for the condition monitoring of a component or system, such as for an aircraft or spacecraft. The method includes: providing an optimized decision tree, the nodes of which contain attributes of an input vector, the leaves of which each contain a classification function and the connections of which between the nodes are weighted; providing an input vector derived from a data signal; implementing a condition monitoring in which the condition of the component or system is determined using the weighted decision tree and on the basis of the input vector. In addition to an item of information concerning which of the classification functions of the decision tree best corresponds to the input vector, an additional item of information concerning the probability with which the other classes of the decision tree correspond to the examined input vector is calculated and output.

15 Claims, 2 Drawing Sheets

(56) References Cited

U.S. PATENT DOCUMENTS

| | | |
|---|---|---|
| 7,558,764 B2 | 7/2009 | Abe et al. |
| 7,892,080 B1 * | 2/2011 | Dahl .................... G06Q 20/202 463/10 |
| 8,814,082 B2 * | 8/2014 | Schievelbusch ... B64D 45/0005 244/213 |
| 2002/0032889 A1 * | 3/2002 | Ghosh ............ G01R 31/318371 714/738 |
| 2003/0236789 A1 | 12/2003 | Agrawal et al. |
| 2012/0130695 A1 * | 5/2012 | Tsourapas ............ G05B 13/048 703/8 |
| 2012/0185172 A1 * | 7/2012 | Barash .................... G06F 19/18 702/19 |
| 2012/0278263 A1 * | 11/2012 | Borthwick ........ G06F 17/30303 706/12 |
| 2013/0304676 A1 * | 11/2013 | Gupta .................... G06N 5/043 706/12 |
| 2014/0237595 A1 * | 8/2014 | Sridhara ............. H04L 63/1408 726/23 |

FOREIGN PATENT DOCUMENTS

| | | |
|---|---|---|
| DE | 4012278 | 10/1990 |
| EP | 1755013 | 7/2006 |

OTHER PUBLICATIONS

International Search Report, Jul. 10, 2012.
Soft decision trees: A genetically optimized cluster oriented approach, Shulka et al., 2007.
Schwingungsdiagnostische Beurteilung von Maschinen und Anlagen, Klein Ulrich, 2000, pp. 153-169.
Diagnosis accuracy in electric power apparatus conditions using classification methods, IEEE Transactions.., 2010, pp. 271-279.
Chinese Office Action, Jul. 3, 2015.

* cited by examiner

METHOD AND DEVICE FOR CONDITION MONITORING

CROSS-REFERENCES TO RELATED APPLICATIONS

This application claims the benefit of the U.S. Provisional Application No. 61/491,407, filed on May 31, 2011, and of the German patent application No. 10 2011 076 780.0 filed on May 31, 2011, and the International Patent Application No. PCT/EP2012/060182, filed May 30, 2012, the entire disclosures of which are incorporated herein by way of reference.

FIELD OF THE INVENTION

The present invention relates to a computer-implemented method and to a device for the condition monitoring of a component or system, in particular of a component or system for an aircraft or spacecraft. The present invention also relates to a computer program product.

BACKGROUND OF THE INVENTION

The concept of condition monitoring is based on a routine or permanent detection of the condition of a machine. The purpose of condition monitoring is on the one hand to increase safety and on the other to increase efficiency. During the condition monitoring of a system or the components thereof, the behaviour of the machine structure is the signal source. A change occurring in the characteristics of the machine structure caused, for example, by the wear of components, is an event to be detected by the machine monitoring procedure. Monitoring takes place by the measurement and analysis of significant physical variables, such as oscillations, temperatures, etc. Condition monitoring consists of a plurality of sub-steps:
  detection of the condition comprises the measurement and documentation of system parameters which reflect the current condition of the respective system or components thereof.
  Comparison of the condition is the comparison between the actual condition and a predetermined reference value. This reference value can be a desired value to be observed as well as a limiting value which is not to be exceeded.
  Diagnosis: based on the results of the condition comparison, it is possible for errors which may be present to be localised as early as possible and for the causes thereof to be determined in order to be able to plan necessary maintenance measures in good time.

Although the present invention and the problem it addresses can be applied in principle to any methods for condition monitoring, they will be described in the following with respect to a method and a device for condition monitoring for use in an aircraft or spacecraft. In particular, the present invention will be described in the following with respect to condition monitoring on the basis of oscillations measured on a component or system of an aircraft.

DE 10 2006 031 009 B4 describes a method and a device for monitoring the condition of structural components of an aircraft. The condition monitoring described therein is based on the optical examination of structural components and on the computer-assisted comparison of the recorded image with a reference image. It is thereby possible for the appearance of the structural components to be monitored. It is not possible to monitor the function of systems and components of an aircraft using this type of optical condition monitoring.

In the case of aircraft, particularly passenger aircraft, for safety reasons alone it is necessary to constantly observe fixedly predetermined maintenance intervals, within which aircraft components and systems have to be examined, maintained and repaired. These intervals are fixed to ensure that the respective components and systems are adequately safe and capable of operating until the next maintenance interval. For this reason, the corresponding maintenance intervals are selected to be suitably generous, typically with a time buffer.

However, it is a problem that with this approach, systems of an aircraft are sometimes also maintained although, for example, they are still fully operational and in fact there is no need for them to be maintained. Thus, it is easily understood that as a result, due to the unnecessary maintenance which is still carried out because the actual conditions are unknown, additional costs are incurred.

In addition, for example in the case of passenger aircraft, the periods of time allocated for maintenance work are very short. This work is usually carried out during the immobilisation times of the aircraft between the arrival of an aircraft at the terminal and the departure from the terminal, for which there is generally only a short period of time available of about 90 minutes. Therefore, in this respect, it is desirable to collect relevant information in advance about the condition of a system or component in the aircraft.

The air conditioning, which is generally also known as HVAC (heat, ventilating and air conditioning) is particularly significant in an aircraft in respect of functionality and of passenger comfort. On the one hand, the air conditioning is to supply the passengers in an aircraft with fresh, temperature-controlled air and to cool the electronic systems. For this purpose, the air-conditioning system uses recirculation fans and filters to be able to circulate the air in the cabin and to clean it. However, the filters which are used can become blocked over time, corresponding supply lines can become soiled and the fan can become faulty, for example, due to the electric motors failing or to the blades of the fan breaking, for example. It is a problem that it is very difficult to predict the blocking of the filters in particular, because this always depends on the surroundings of the respective filters and on the region of use. Therefore, this means that these filters are checked very often in situ, which involves additional examination times during the immobilisation times of the aircraft.

This is a situation which is understandably to be avoided.

SUMMARY OF THE INVENTION

Against this background, an idea of the present invention is to be able to provide an improved condition monitoring for a component or system, particularly when used in an aircraft or spacecraft.

Accordingly, there is provided:
  a computer-implemented method for the condition monitoring of a component or system, particularly a component or system for an aircraft or spacecraft, comprising: provision of an optimised decision tree, the nodes of which contain attributes of a respective input vector, the leaves of which each contain a classification function and the connections of which between the nodes of the decision tree are weighted; provision of an input vector which is derived from a data signal; implementation of a condition monitoring in which the condition of the component or system is determined using the weighted decision tree and on the basis of the input vector, in that in addition to an item of information concerning which of the classification functions of the decision tree best corresponds to the input vector, an additional item of information concerning the probability with which the other classes of the decision tree correspond to the examined input vector is calculated and output.

a device for the condition monitoring of a component or system, in particular using a method according to the invention, comprising a measuring device which is configured to measure a measurable physical variable at the component or system in order to generate a time-dependent sequence of data points; a memory in which at least one time-dependent sequence of data points can be stored; a logic-arithmetic and evaluation device which is configured to generate an optimised decision tree using at least one of the time-dependent sequences of data points and to carry out a condition monitoring using the decision tree produced thus.

a computer program product in which a computer program is stored, which is configured to implement a method according to the invention.

The understanding on which the present invention is based is that most systems have characteristic, system-inherent operating characteristics which allow conclusions to be drawn about the characteristics and the condition of the respective systems. For example, oscillations in a system or component or the temperature thereof can be measured at more or less regular intervals. The idea is that the measured data collected thus is an indication of the condition and the characteristics of the investigated system or of the corresponding component. With a suitable interpretation of this measured data, conclusions can thus be drawn about the change in the characteristics and in the condition of this system or component. In particular under the premise that the condition of a system or component will deteriorate rather than improve as the service life thereof increases, it is possible to come to conclusions about the momentary condition of the system or component while drawing on additional assumptions and using a suitably obtained decision tree.

The present invention makes it possible to provide an automated condition monitoring for components and systems to be examined, particularly within an aircraft, without any particular knowledge of mathematical correlations. For this purpose, measured data is analysed using an analysis model. For this analysis model, it is unnecessary in some manner to have a precise knowledge of the nature of the article to be examined, for example the physical characteristics or construction thereof, and the like. A suitably selected decision tree is used for the condition monitoring, which decision tree is provided for the classification of the data required for analysis and evaluation. It is then possible to provide optimised data by means of a suitable learning or training concept which is applied to the decision tree. It is thus possible to carry out an adapted condition monitoring which already considers the dynamic behaviour of the system or component to be investigated.

By means of the method according to the invention for condition monitoring, it is advantageously possible to establish maintenance intervals such that they are adapted to the actual respective conditions of the system or component which is examined. In particular, this prevents unnecessary maintenance work being carried out, which results in significant cost savings. Conversely, it also means that maintenance work which is necessary will be carried out. This enhances the respective comfort for the passengers.

Suitably selected decision trees are an essential part of the invention. Decision trees are tabulated directional trees which are used to depict decision rules. They hierarchically illustrate successive decisions and are a method for the automatic classification of data objects and thus for the solution of decision problems. A decision tree always consists of a root node which serves as an input node for an input vector, any number of inner nodes as well as at least two leaves. In this respect, each node represents a logical rule which is called an attribute. Assigned to an attribute is a characteristic which is associated with a respective node of the decision tree and which thus generally functions as a feature, a characteristic or an information detail of the node. A leaf corresponds to the classification. Each leaf contains a response to a complex decision problem which is also called a classification. More or less complex classification functions are thus assigned to the leaves. A great advantage of decision trees is that they can be easily explained and understood. This enables the user to evaluate the result and to recognise key attributes. This is particularly useful when fundamental characteristics of the data are not known from the start. Thus, the induction of decision trees is also an important data mining method. Data mining is understood as meaning the systematic application of methods, which for the most part have a statistical-mathematical basis, to a database with the objective of recognising patterns or trends therein.

In order to read off a classification of an individual data object on the decision tree, a path is taken downwards from the root node along the decision tree. An attribute is queried at each node and a decision is made about the choice of the following node. This procedure is continued until a leaf is reached. The particular advantage of the present invention is that in addition to the mere query, the respective responses are also weighted. In this manner, a plurality of results, i.e. a plurality of classifications which, unlike previous decision trees, also state the probabilities of the various possible results is obtained at the output, i.e. at the leaves, of the decision tree. Specifically, probabilities of various possible results are output onto an input vector as the result of a decision tree.

In this manner, it is possible to implement a condition monitoring of the air-conditioning system, in which a reliability of the result is also output to a certain extent. In addition to a pure result whether or not the air conditioning is still operational, a relationship of this result with other possible results of the decision tree is also produced.

Advantageous configurations and developments of the invention are provided in the further subclaims and in the description with reference to the figures of the drawings.

In a typical configuration, the weighting of the connections between the nodes of the decision tree is defined such that they constitute an indication of the distance of the value of a respective attribute from the input vector.

In a preferred configuration, the data signal is determined by a continuous-time or discrete-time measurement of a physical variable at the component or system. In this respect, the measured data signal can be determined by measuring an oscillation, for example a mechanical oscillation (vibration) or an acoustic oscillation (noise). The method according to the invention can be used particularly preferably in a system which is configured as an air-conditioning system in an aircraft or spacecraft and in which an oscillation (vibration or noise) generated by the air-conditioning system, for example, is measured as the investigated physical parameter. This is particularly advantageous because oscillations of this type typically change only very slowly, for example in the case of a recirculation filter which becomes increasingly soiled. This change can be simply and reliably detected by a condition monitoring which is carried out at regular intervals. If, for example, an element of the air-conditioning system, such as the recirculation filter or the fan is faulty, this is expressed, for example, as an increase in the vibration which can thus be measured and evaluated as an indication of the condition of this system. However, the invention is not restricted to the measurement and evaluation of a physical parameter configured as oscillations, but can also be extended, for example, to other physical parameters, such as temperature, weight, EMV radiation, electric currents and voltages, etc.

In a preferred configuration, the data signal is pre-processed to generate the input vector. During this pre-processing, the data signal can be divided into predetermined time periods, for example. Furthermore, a continuous-time sequence of discrete-time data points can be determined from the data signal, for example by sampling. This measure is based on the understanding that in order to generate an input vector, the entire data signal does not necessarily have to be used, but it is often sufficient to merely use a predetermined time period and for example within this predetermined time period, to use only individual discrete-time data points. This significantly reduces the complexity of the analysis and evaluation of the data signal and thus the complexity in generating the input vector. A stronger or less strong noise signal is typically superimposed on a measured data signal, depending on the measuring method or signal source. In the context of the pre-processing, it would also be advantageous for this superimposed noise signal to be at least reduced and, ideally, completely eliminated. This noise reduction is possible, for example, in a very simple manner by transforming the data signal into the frequency range, for example by an FFT transformation, and by filtering out the frequency bands representing the noise in the frequency range. Reducing or eliminating the noise signal superimposed on the data signal provides a better quality of the generated input vector and thus also a better quality of the condition monitoring. Finally, it would also be possible for the measured data signal to be transformed into the frequency range, for example by FFT transformation, to be further analysed there. In the frequency range, particular characteristics of the data signal can be determined and used to generate the input vector, which characteristics cannot be recognised, for example, from the data signal analysed in the time range.

In a typical configuration, mean values, maximum values, minimum values, gradients and/or turning points of the data signal are determined during the pre-processing of the data signal in the time range for the entire data signal and/or for at least one predetermined time period of the data signal. In this manner, additional information is obtained which is inherent in the measured data signal and which particularly characterises the data signal and thus the physical variable to be determined.

In a configuration which is also particularly preferred, an average frequency, a maximum frequency, a minimum frequency and/or a number of frequency peaks are determined during the pre-processing of the data signal in the frequency range for the entire frequency signal and/or only for predetermined frequency blocks of the frequency signal. The number of frequency peaks can be measured for one or more frequency blocks or, for example, also for the entire frequency signal.

Due to the mentioned evaluation of the data signal in the time range and/or in the frequency range, additional information can be generated from the data signal, which information is an indication of the measured data signal and thus of the physical variable to be investigated. The present invention is based on the understanding that the entire measured data signal and additional information which may be obtained therefrom does not necessarily have to be used for the condition monitoring of a component or system. Instead, it often suffices to use a few, for example characteristic properties of the component or system to be investigated. For this reason, in a particularly preferred configuration, during the pre-processing of the data signal, the data content of the data signal is reduced. A data-reduced sequence of data points obtained from this reduction of the data content and/or other data information obtained during the pre-processing of the data signal can then be used to generate the input vector for the decision tree. This generally reduces the complexity of the analysis and evaluation of the data and thus reduces the complexity of the condition monitoring.

In a typical configuration, a feature vector is initially calculated for the provision of an optimised decision tree. Training data and a set of parameters are provided for the calculation of the feature vector.

The set of parameters preferably contains parameters required for generating the feature vector, and particularly contains at least one of the following parameters:

number of maximum, minimum and/or mean values of the measured data signal in the time range and/or in the frequency range;
  length of a data portion used for the analysis;
  number of data points obtained by sampling within a data portion;
  number and width of the frequency blocks for a predetermined time period of the measured data signal;
  number of frequency peaks (i.e. frequencies which exceed a predetermined limiting value) within a frequency block or the entire frequency signal;
  extent of the noise suppression.

In addition or alternatively, it would of course also be possible to use other parameters for the predetermined set of parameters, such as turning points and gradients of a predetermined portion of a measured data signal, an admissible error resulting during the calculation, correction values and the like.

In a preferred configuration, a physical variable of the component or system to be investigated is measured for the provision of the training data. A predetermined number of data points can then be generated by sampling from the measured data signal, determined thus, for example for a predetermined time period. By selecting a predetermined number of data points from these sampled data points, it is then possible to form the time-dependent sequence of data points which form the time-dependent sequence of data points required to generate the feature vector.

Random values are preferably established as the set of parameters at the beginning, i.e. at the start of the determination of the feature vector provided to generate a decision tree. Using the training data and the set of parameters, starting from the random values, an increasingly optimised decision tree is then calculated iteratively until an error in the decision tree falls below a predetermined threshold value. Thus in particular, a set of parameters is optimised until a stable value is produced. A stable value can be present when, for example, the set of parameters does not change any more. It is then assumed that this determined and thereby optimised set of parameters is optimised based on the decision tree and on the training data which is used. The set of parameters typically changes during each iteration of the optimisation, the change typically becoming smaller as the iteration increases. The break-off criterion, at which the iteration for determining the optimised set of parameters is concluded depends on the respectively selected break-off criteria. For example, the greatest accuracy in the used optimisation algorithm can also be provided as the break-off criterion. Typically but not necessarily, a genetic algorithm is used as the optimisation algorithm. This can be implemented very easily and has comparatively very good results.

In an advantageous configuration, the decision tree is calculated using an ID3 (Iterative Dichotomiser 3) algorithm or C4.5 algorithm, the optimised feature vector, calculated during the optimisation of the set of parameters, being provided as the input vector. In addition to these algorithms, it would also be possible to use a CART (Classification and Regression Trees) algorithm or CHAID (Chi-square Automatic Interaction Detectors) algorithm. The ID3 algorithm is used when, in the case of a large amount of data, many different attributes are significant and thus a decision tree is to be generated without a great amount of calculation. The structure of the decision trees generated from an ID3 algorithm is for the most part very simple. In the case of a CART algorithm, only binary decision trees can be generated, i.e. precisely two branches are always present at each ramification. Thus, the central element of the CART algorithm is finding an optimum binary division. The C4.5 algorithm behaves very similarly to the CART algorithm, a binary division not having to be made in the C4.5 algorithm, but any number of ramifications can be incorporated, which is very advantageous for many uses. Consequently, the decision tree of the C4.5 algorithm is broader, but is also generally not as low. For this, after the first classification, the following splits become less significant. Unlike other algorithms, in the case of the CHAID algorithm, growth of the decision tree is stopped before the tree has become too large.

After the decision tree has been generated, it is preferably trained by iteration using learning data provided specifically for this purpose. This learning or training phase of the decision tree does not have to be provided, but is advantageous. In principle, the learning data can have an appropriate syntax like the training data, in other words a number of data points can likewise be used as learning data, which data points have been determined, for example, by measurement or in another manner and contain a time-dependent sequence of data points.

In a preferred configuration, the device according to the invention is configured as an electronic measuring box and in particular as a temperature and/or oscillation measuring box. This electronic measuring box has an interface by which the measuring box can be attached to the component or system to be investigated. Thus, via the electronic measuring box, the data respectively required for the trend prediction and thus the corresponding physical variable to be measured can be determined by direct or indirect measurement. If temperature is to be measured, the electronic measuring box has, for example, a sensor which is configured as a temperature sensor and detects the temperature of the component or system to be investigated. If a vibration or another oscillation is to be measured, appropriate vibration or oscillation sensors are provided.

The above configurations and developments can be combined with one another in any manner, if appropriate. Further possible configurations, developments and implementations of the invention include previous combinations which have not been explicitly mentioned or features of the invention which are described in the following with respect to the embodiments. In particular, a person skilled in the art will also add individual aspects as improvements or additions to the respective basic form of the present invention.

BRIEF DESCRIPTION OF THE DRAWINGS

In the following, the present invention will be described in more detail with reference to the embodiments represented in the schematic figures of the drawings, in which.

Figure 1:
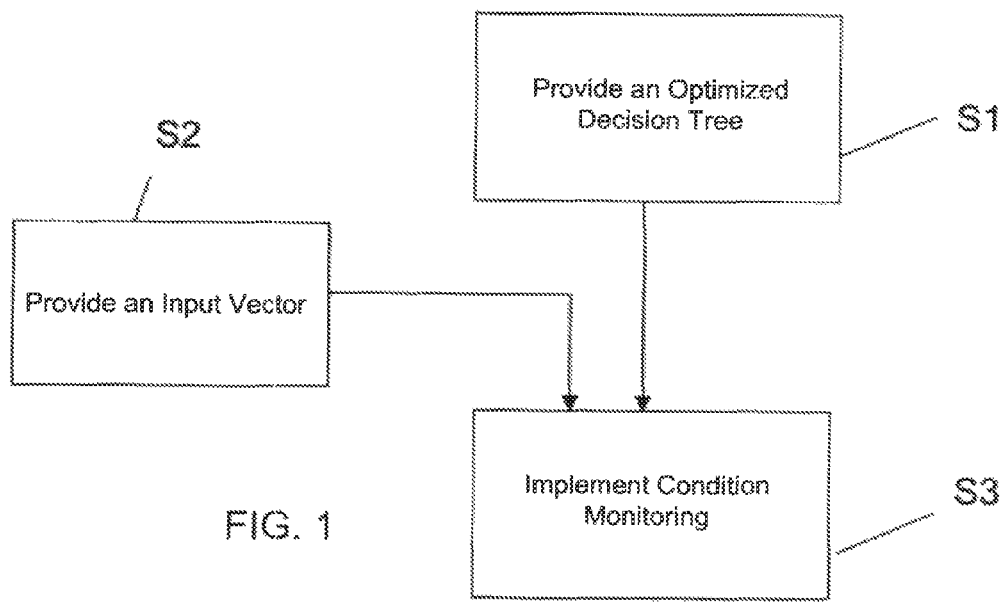
FIG. 1: is a flow chart to illustrate the course of a first, general embodiment of the method according to the invention.

The appended drawings are to provide a further understanding of the embodiments of the invention. They illustrate embodiments and, in connection with the description, serve to explain principles and concepts of the invention. Other embodiments and many of the mentioned advantages are revealed with regard to the drawings. The elements of the drawings have not necessarily been shown true to scale relative to one another.

In the figures of the drawings, the same, functionally identical and identically operating elements, features and components have been provided in each case with the same reference numerals, unless indicated otherwise.

DETAILED DESCRIPTION OF THE PREFERRED EMBODIMENTS

FIG. 1 shows a flow chart to illustrate the course of a first, general embodiment of the method according to the invention.

The method according to the invention is a computer-implemented method for the condition monitoring of a component or system. It is assumed that the system is an air-conditioning system in an aircraft. The condition of the air-conditioning system is to be derived using an oscillating vibration which is generated by the air-conditioning system and is measured and evaluated accordingly.

At S1, an optimised decision tree is initially provided. The generation of the optimised decision tree will be described in more detail in the following with reference to FIG. 2. Input into the input or root node is a suitably selected input vector which is derived from a measured data signal and has various discrete data points characterising the input signal. The nodes of the decision tree denote the attributes of the input node, for example the data points of a respective input vector. The leaves each represent a classification. The distinctive feature of the optimised decision tree which is used is that here, the connections between the nodes of the decision tree are also weighted.

A particularly significant aspect in the optimised and weighted decision tree is that here all the connections (or also for example only the connections of the top hierarchy stage) between the nodes of the decision tree denote the distance of the value of an attribute of a node of the decision tree from the input vector. In this manner, in contrast to previous solutions in which only binary statements were made while passing through the decision tree, probabilities can be provided in the continuous path of the decision tree. Consequently, the output result is more reliable.

At S2, an input vector is initially provided. The input vector is derived from a measured data signal or from a data signal which is possibly also provided in another manner. It is assumed that the data signal is a vibration measured at the air-conditioning system. In this respect, the input data for the decision tree can be data points derived from the data signal, as also used, for example, for the generation of the feature vector to generate the decision tree. The input data for the decision tree can also be suitably pre-processed, for example, in that only a few values which characterise the measured data signal are used. The generation of the input vector will also be described in more detail in the following with reference to FIG. 2.

The actual condition monitoring then takes place at S3. During condition monitoring, the condition of the air-conditioning system is determined based on the measured vibration signal using the weighted and optimised decision tree. For this purpose, the input vector determined at S2 is input into the decision tree. By means of the weighted decision tree, it is then possible to determine an additional item of information in addition to an item of information concerning which of the classification functions of the decision tree best corresponds to the input vector which has been introduced. Furthermore, this additional item of information shows the probability with which the other classification functions of the decision tree correspond to the input vector. This information about the respective probabilities can be read at the output of the decision tree. In this manner, it is possible to realise a significantly more reliable condition monitoring, which is particularly optimised in terms of information, of the air-conditioning system. This calculation takes place in a fully automated manner.

The condition of a component or system in the aircraft can be monitored in situ, i.e. during operation of the aircraft, and also continuously. However, this is not necessarily required, since the conditions of the corresponding systems and components, for example of the air-conditioning system in the aircraft, typically do not change very dynamically and furthermore no appropriate maintenance measures can generally be carried out during the flight. For this reason, it is sensible to only carry out this condition monitoring at regular time intervals. For example, it can be provided that this condition monitoring is only carried out at the start of a flight and/or during a flight. If this condition monitoring shows that the condition of, for example, the investigated air-conditioning system is no longer satisfactory, the appropriate maintenance measures can be taken immediately at the end of the flight. The particular advantage is that this finding is already known before the start of the next flight or during the flight, so that it can already be announced in advance for the next immobilisation time that the necessary maintenance work needs to be carried out. In particular, it would be possible here for the corresponding device for condition monitoring to have a specifically provided air interface by which a central installation of the aircraft operator is provided with the information that maintenance has been requested. The aircraft operator can then initiate the appropriate measures in advance, i.e. before the aircraft lands, it for example can make available the repair tools and replacement parts required for the maintenance work. This obviates the need for complex analysis methods during the short immobilisation times of the aircraft between landing and take-off.

Figure 2:
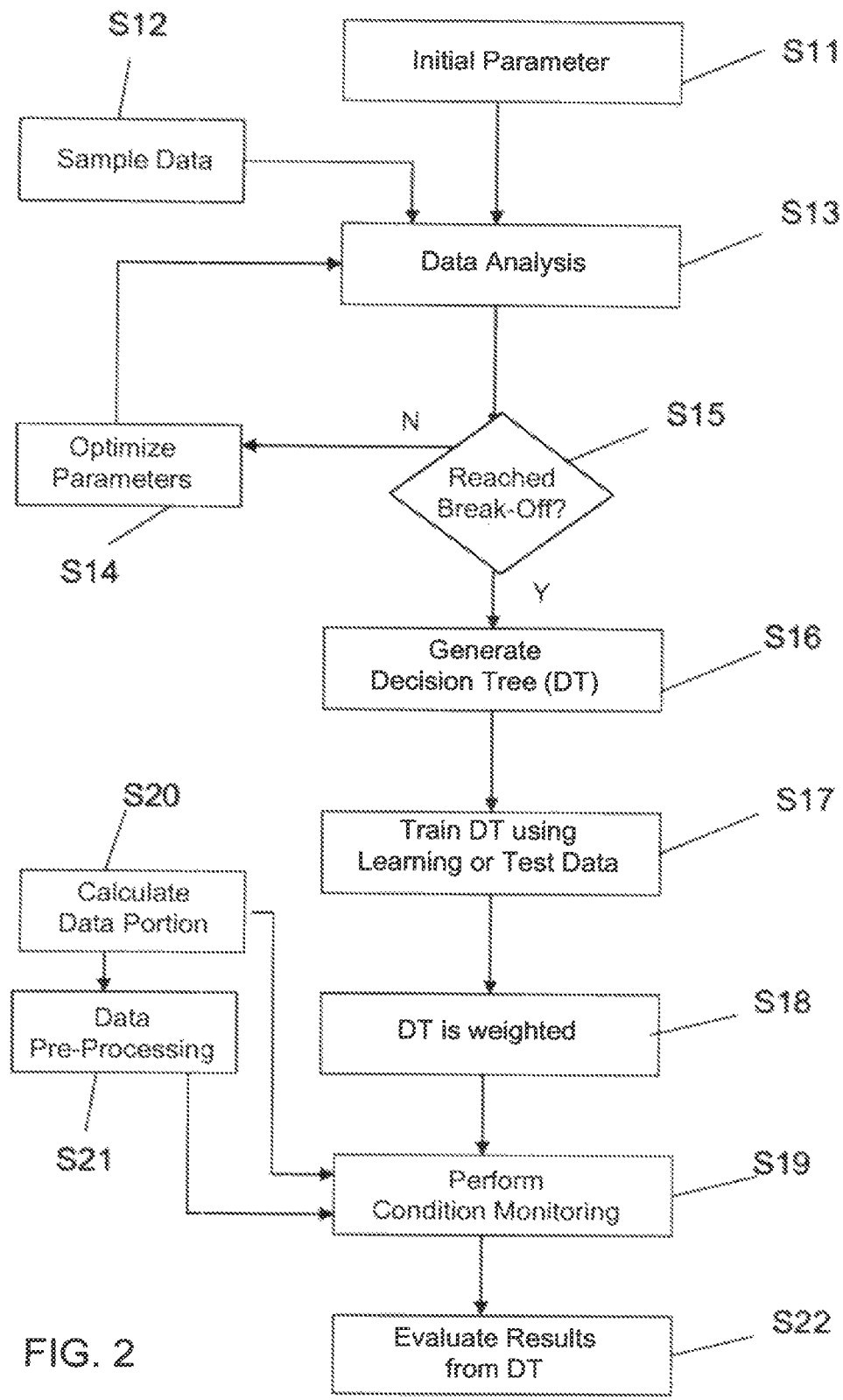
FIG. 2: is a flow chart to illustrate the course of a second, preferred embodiment of the method according to the invention.

FIG. 2 shows a flow chart to illustrate the course of a second, preferred embodiment of the method according to the invention.

At S11, a set of starting parameters is initially generated which is provided for the analysis of the measured data signal or of data derived therefrom. Different parameters which can influence the generation of the decision tree can be used for the set of starting parameters. These parameters are typically established by the user. The parameters associated with the set of parameters can be, for example:
   mean values or maximum values of the measured data signal in the time range and/or frequency range;
   the factor provided for the noise suppression, i.e. the extent of the noise suppression applied to the measured data signal;
   thresholds for the detection of frequency peaks of the data signal transformed into the frequency range;
   number of frequency peaks (i.e. overstepping of the limiting value) of the data signal in the frequency range;
   number and length of frequency blocks of the data signal transformed into the frequency range.

In addition to these parameters, further parameters can naturally also occur such as the number of data points, provided for the training of the decision tree, of a sequence of data, the number and type of the classification functions used in the decision tree for classification, and the like.

At S11, the initial values of the parameters of the set of starting parameters can initially be selected as desired, for example, by randomly setting the values of the respective parameters. These parameter values are continuously optimised in a subsequent process, to be described later on, using a suitable optimisation algorithm.

At S12, one or more sequences of data points are initially provided. The sequence of data points can be generated, for example by measuring a physical quantity, in the present case the vibration for example. If the measured data signal is present as a continuous-time analogue data measurement signal, the various data points for generating the time-dependent sequence of data points can be generated, for example, by sampling the measured data signal. The data points obtained in this way are thus present in a discrete form.

At S13, the continuous-time data points generated thus are subjected to a data analysis together with the set of parameters which has been provided at S11 and has the initial random parameter values. In the course of this data analysis, one or more of the following analytical steps can be carried out based on the selected (optionally optimised) set of parameters:
   the maximum, minimum and/or mean values can be calculated for the sequence of the data points.
   The sequence of the data points can be transformed into the frequency range by Fourier transformation. The maximum, minimum and/or mean values can then also be calculated for the data series transformed thus.
   Furthermore, it is possible to divide the data series in the frequency range into segments (so-called frequency blocks). The respective maximum, minimum and/or mean values can also be calculated for these segments.
   If the data series has been divided into segments in the frequency range, it is also possible to transform these segments back again into the time range. The maximum, minimum and/or mean values can then be determined in the time range for the segments which have been transformed back.
   In addition to the maximum, minimum and/or mean values, the frequency peaks for the entire data series or for only one, a plurality of segments or all the segments can also be calculated in the frequency range. The term "frequency peaks" is understood as meaning the number of values in the frequency range which exceed a specific limiting value. This limiting value is determined, for example, by the set of parameters which is used.

At S14, the fundamental set of parameters is optimised using the sequence, determined thus, of features. In this optimisation, it is possible for known optimisation algorithms, for example a genetic algorithm, to be used.

Genetic algorithms of this type denote algorithms which can also deal with non-analytically resolvable problems in that they repeatedly generate different solution proposals. In these repeated solution proposals, i.e. the optimisation steps, they change the respective items of input data and combine them with one another to achieve a readout. Determined as items of output data are solution proposals for the subsequently used input data which comply in an ever improving manner with the requirements made as the iteration and optimisation increases. Genetic algorithms of this type are heuristic optimisation methods, belonging to evolutionary algorithms. They are used in particular for problems for which a closed solution cannot be calculated or cannot be calculated efficiently. Instead of genetic algorithms, a memetic algorithm would be possible for optimisation. However, genetic algorithms are the simplest evolutionary optimisation methods which can also be implemented very quickly and can be adapted to new problems.

During each iteration, a so-called feature vector is generated which, based on the data points, contains an item of classification information as well as corresponding optimised parameter values of the set of parameters. This feature vector typically changes during each iteration and thus during each optimisation step. With an increasing iteration and thus with an increasing run through the optimisation S14, optimised classification information, i.e. an optimised classification, as well as optimised parameter values of the set of parameters are produced for the initially selected data points within the data portion.

This optimisation algorithm S14 is carried out until a break-off criterion is reached. As the break-off criterion at S15, it can be provided, for example, that the optimisation-generated parameters of the set of parameters as well as the determined classification have reached a stable value which, for example, no longer changes their value. It would also be possible for a calculated error to fall below a specific predetermined value. The break-off criterion typically also depends on the optimisation algorithm which is used. For example, it can be provided within the optimisation algorithm that a maximum accuracy is desired. If this maximum accuracy is achieved during optimisation, the break-off of the optimisation can be established.

Then, at S16, the decision tree is generated in a known manner. An algorithm known per se, for example the ID3 algorithm or C4.5 algorithm, is used to generate the decision tree. To generate the decision tree, the optimised feature vector, generated at S14, is used which thus contains respective classification information and a correspondingly optimised set of parameters for the initially used sequence of data points. A decision tree is thus generated, the leaves of which contain a classification function. The nodes of the decision tree contain the attributes of the feature vector, i.e. the information which is derived from the data points of the data portion to be examined.

At S17, the decision tree generated thus can be trained using learning or test data. In this manner, the generated decision tree can be further refined and optimised.

Thereafter, at S18, the thus optimised decision tree is weighted in a suitable manner. During the weighting of the decision tree, the connections between the various nodes of the decision tree are provided with a weighting factor. As a result, in addition to receiving the attributes which are associated with the various nodes and the respective classifications stored in the leaves, the decision tree also receives an additional item of information which states the extent to which the adopted path in the connection deviates from the decision which has been made. In this way, a so-called fuzzy classification method is provided which is based on the theory of fuzzy sets, i.e. based on a fuzzy logic. By means of a weighted decision tree of this type, it is thus possible to output a number of different results instead of a single result which corresponds best to an output-side classification. In this respect, each result associated with a respective weighting of the decision tree contains an additional item of information stating the probability with which the output result corresponds to the associated classification.

In the present embodiment, this weighting of the decision tree is carried out after the generation, optimisation and the optional learning process of the decision tree. However, it would also be possible for the weighting to be carried out in the creation phase of the decision tree, for example during S16.

Thereafter, the actual condition monitoring S19 of the air-conditioning system is carried out. An optimised and weighted decision tree, as established at S18 for example, is used for this condition monitoring. A sequence of data points which form a data portion is provided here as the input vector for the decision tree.

The data portion used for condition monitoring is calculated at S20 previously. For this purpose, a physical variable is measured, for example a vibration of the air-conditioning system of the aircraft. This measured data signal is sampled to establish therefrom data measuring points which are used for condition monitoring. A predetermined number of data points established in this way form the input vector which is input into the optimised and weighted decision tree at S19 for the purpose of condition monitoring.

In addition, a further data pre-processing S21 can also be provided. This further pre-processing can be used to obtain further additional information from the measured data signal. This additional information can be used in addition to or as an alternative to the measured data signal to determine the input vector for the decision tree.

In the pre-processing S21 of the measured data signal, a method for noise reduction and, ideally, for noise suppression is typically used to at least reduce a noise signal which is superimposed on the measured data signal. In addition, further information can be ascertained from the data signal, such as in the time range the calculation of a mean value, minimum values, maximum values, gradients, turning points and the like. In addition, it would also be possible to divide the measured data signal into a plurality of time segments of a predetermined duration and to determine the above-mentioned information merely within a time segment of this type.

In the pre-processing S21, the measured data signal can also be transformed into the frequency range, for example using an FFT, in order to derive therefrom corresponding frequency peaks, mean values, maximum values, minimum values of the frequency and the like. Furthermore, the data signal transformed into the frequency range can also be divided into corresponding frequency blocks of the same or a different length to determine the corresponding frequency information only within the frequency blocks. Overall, additional characteristics and parameters inherent in the data signal which are characteristic of the data signal can be determined during the pre-processing.

To provide the input vector, the measured data signal is sampled to determine corresponding data points. The input vector which is input into the optimised and weighted decision tree can be generated from these data points. This input vector can additionally or alternatively also be formed by the mentioned additional information derived from the measured data signal. It has been found to be particularly advantageous for the generation of the input vector if only those values are used which are particularly characteristic of the measured input signal. These are not necessarily the data points obtained by sampling, but instead very often the corresponding maximum, minimum and mean values or corresponding gradients. These data very effectively represent the characteristics of the input signal and thus the air-conditioning system to be monitored.

During the condition monitoring at S19, the input vector, obtained at S20 and/or S21 is coupled into the optimised and weighted decision tree. Starting therefrom, the decision tree establishes at its output a probability for each leaf of the decision tree, i.e. for each classification. Thus, a result stating a probability with which the result corresponds to the respective classification is delivered at the output of the decision tree. In previous unweighted decision trees, only a single result was output which was associated with only a single classification. In the weighted decision tree according to the invention, probabilities for all possible results are now also output. This is particularly advantageous when several probable results are present. With previous solutions, it was impossible to determine whether and to what extent there were any further probable results. This is now possible by the method according to the invention.

At S22, the results obtained using the weighted decision tree, i.e. the results associated with the various classifications together with their probabilities are evaluated. Therefore, the method according to the invention allows conclusions to be drawn about the condition of the air-conditioning system.

Specifically, it can be provided, for example, that the determined vibration values of the measured oscillation are compared with a predetermined vibration threshold. In addition, the truth content of the result is verified by the method according to the invention. If the vibration determined by condition monitoring exceeds, for example, an application-based predetermined vibration threshold, it can be concluded that there is a fault in the air-conditioning system, for example due to a malfunctioning recirculation filter or a defective fan, or it can at least be concluded that the condition of these components is deteriorating. Since the extent to which the determined measured data is correct is now also known as additional information, which is possible due to the probabilities determined by the weighting of the decision tree, it can also be learnt from this whether, to what extent and possibly when the air-conditioning system has to undergo the next maintenance procedure. In this manner, it is very advantageously possible to recognise very early on the necessity for upcoming maintenance work and to thus initiate the appropriate steps at a very early stage. In particular, it is possible to determine very early on, for example before the start of the next departure of the aircraft or, if appropriate during the flight but preferably a few days beforehand, when the next maintenance procedure is required. In particular, this reduces the period of time necessary for servicing and maintenance, since it is possible to dispense with a time-consuming in-situ analysis. This analysis has already been concluded in a simple and fully automated manner by the condition monitoring according to the invention, so that during the immobilisation times of an aircraft, only maintenance work has to be carried out and not the corresponding analysis.

Figure 3:
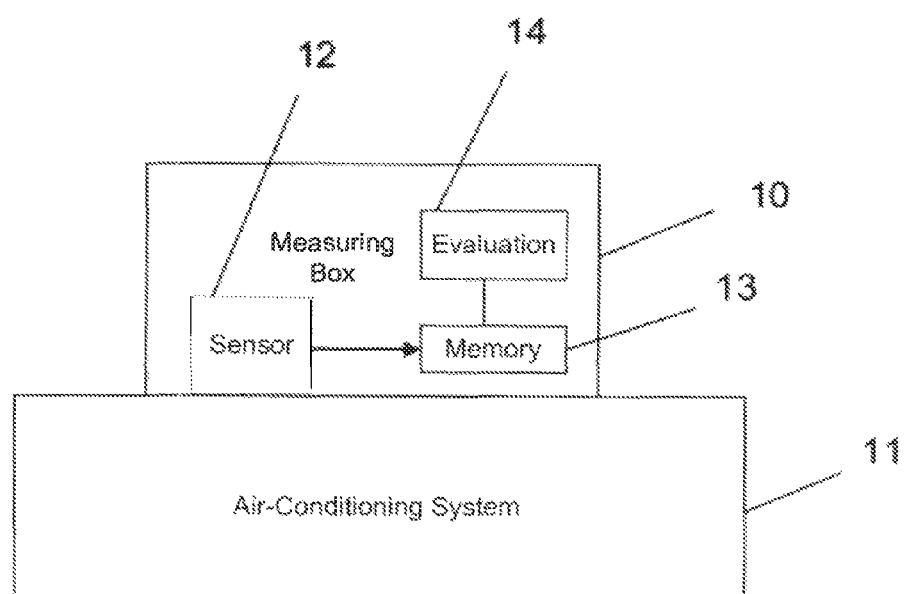
FIG. 3: is a block diagram of a device according to the invention.

FIG. 3 shows a block diagram of a device according to the invention. The device according to the invention, denoted here by reference numeral 10, is a measuring box for determining and evaluating the vibrating oscillations of a component or system of an aircraft. In the present embodiment, this system is the air-conditioning system 11 of an aircraft.

In the illustrated example, the measuring box 10 according to the invention is arranged in direct contact with the air-conditioning system 11 and here in particular with a vibration-relevant region of the air-conditioning system 11. The measuring box 10 according to the invention has a measuring device 12, a memory 13 and a logic-arithmetic and evaluation device 14. In the illustrated example, the measuring device 12 is configured as a vibration sensor. This vibration sensor 12 is configured to measure a vibrating oscillation in the vibration-relevant region of the conditioning system 11 in order to determine therefrom a time-dependent sequence of data points in the previously described manner. This time-dependent sequence of data points can initially be stored in a memory. An optimised and weighted decision tree is generated by the logic-arithmetic and evaluation device 14, for example using a method described with reference to FIGS. 1 and 2. Furthermore, using the logic-arithmetic and evaluation device 14 and on the basis of the decision tree generated thus, it is possible for a condition monitoring to be carried out in respect of the time-dependent sequence of data points, determined by the measuring device 12.

In further embodiments, the system of an aircraft can be a further component of an aircraft, for example an electrical component of an aircraft or a mechanical component of an aircraft.

If the system of an aircraft is configured as an electrical component of an aircraft, said component can be configured as, for example, an electric motor, another electrical actuator, an electric sensor, an electric control device, an electric component of the aircraft control, an electric cockpit instrument or the like.

In an embodiment of this type, the measuring box 10 can have a measuring device 12 which is configured as a sensor, for example, and is configured to measure an electric current consumed by the respective component, to measure an electric supply voltage, a temperature or other electric variables. If the electric component is configured as an electric motor, the sensor 12 can also be configured to measure a rotation, a torque or the like at the rotor axis of the electric motor.

If the system of an aircraft is configured as a mechanical component of an aircraft, said component can be configured as, for example, an electric motor, a turbine, a mechanical actuator, a control surface of the aircraft, for example a rudder, an elevator, an aileron or a landing flap or the like.

In an embodiment of this type, the measuring box 10 can have a measuring device 12 which is configured as a sensor, for example, and is configured to measure an acceleration, a vibration, a movement, for example a translation or a rotation, a temperature, a pressure or the like.

In an embodiment of this type, the logic-arithmetic and evaluation device 14 has at least one interface by which the logic-arithmetic and evaluation device 14 can pick up data from the measuring device 12. This interface can be, for example an analogue interface, a voltage-based or current-based interface. However, the interface can also be configured as a digital interface, for example as an SPI, I2C, CAN, LIN interface or the like.

In an embodiment, the logic-arithmetic and evaluation device 14 is configured to generate the starting set of parameters in a random manner. Finally, the logic-arithmetic and evaluation device 14 is configured to generate a decision tree by means of the starting set of parameters and to optimise the decision tree on the basis of the series of measurement values determined by the measuring device 12. During the optimisation of the decision tree, the logic-arithmetic and evaluation device 14 can use measurement values from the series of measurement values to control the quality of the decision tree.

To monitor a component of an aircraft, the logic-arithmetic and evaluation device 14 continuously acquires measurement values from at least one measuring device 12 and generates from these measurement values a series of measurements. In this respect, the length of the series of measurements can be predetermined or can vary. In an embodiment, the series of measurements can then be directly used as an input vector of the decision tree. In a further embodiment, the logic-arithmetic and evaluation device 14 can extract particular features of the series of measurements and can use these extracted features as an input vector for the decision tree.

These features can be, for example, mean values or maximum values of the measured value of the series of measurements in the time range and/or frequency range, the number of frequency peaks (i.e. overstepping of threshold values) of the series of measurements in the frequency range, the number and length of the frequency blocks of the data signal transformed into the frequency range, or the like.

Thereupon, the logic-arithmetic and evaluation device 14 runs through the decision tree which, in an embodiment, provides a classification function and a probability of the applicability of the classification function. In an embodiment, the logic-arithmetic and evaluation device 14 also extracts the probabilities with which the further classification functions stated in the decision tree could apply.

Although the present invention has been entirely described above with reference to preferred embodiments, it is not restricted thereto, but can be modified in many different ways.

Thus, the present invention is not necessarily to be restricted to use in an aircraft or spacecraft, although the invention is particularly preferably used in the case of passenger aircraft. It is particularly advantageous in passenger aircraft in order to be able to effectively use the short immobilisation times between landing and take-off for maintenance work. However, it goes without saying that the present invention can naturally also be employed for other uses, for example in boats, buses, trains and the like. In particular, the present invention would also be particularly preferred especially when used in automotive engineering.

Furthermore, the invention does not necessarily have to be used for condition monitoring of data points obtained from vibration measurement. In addition to vibration or the corresponding oscillations as a physical variable for condition monitoring, it would also be possible to use other measurement parameters, such as acoustic oscillations (noise), temperature and the like.

In addition to the mentioned algorithms for generating the decision tree or for optimising data, other algorithms could naturally also be used in an advantageous manner.

Moreover, it goes without saying that the stated numerical information is merely to provide a clearer understanding of the invention, without thereby restricting it.

It also goes without saying that in the above embodiments, only preferred embodiments have been described which, however, can be varied or modified in a diverse manner. For example, in the preferred method for condition monitoring which has been described above with reference to FIG. 2, it would also be possible to dispense with various steps, such as break-off conditions or break-off steps, learning or training steps and the like. Likewise, it would be possible to add further steps or to change the sequence of method steps.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A computer-implemented method for monitoring a component or system of an aircraft or spacecraft, comprising:

generating an optimized decision tree, using the computer, nodes of which contain attributes of a respective input vector, leaves of which each contains a classification function and associated connections of which between the nodes of the decision tree are weighted;

providing the input vector which is derived from a data signal received from a sensor that monitors the component or system of the aircraft or spacecraft;

storing the data signal received from the sensor in a memory for subsequent retrieval for evaluation;

implementing a condition monitoring, using the computer, based on the evaluation of the data signal stored in the memory, in which a condition of the component or system is determined using the weighted decision tree and on the basis of the attributes of the input vector, in that an item of information concerning which of the classification functions of the decision tree best corresponds to the input vector based on the weighted decision tree, is calculated and output;

calculating, using the computer, a probability of an applicability of the corresponding classification function for each leaf of the weighted decision tree; and delivering, using the computer, a result stating the probability at an output of the weighted decision tree that corresponds to the leaf of the weighted decision tree, wherein the data signal is determined by at least one of a continuous-time and discrete-time measurement of a physical variable at the component or system.

2. The method according to claim 1, wherein a weighting of the connections between the nodes of the decision tree denote a distance of a value of the corresponding attribute from the input vector.

3. The method according to claim 1, wherein the physical variable measured is at least one of an acoustic and a mechanical oscillation.

4. The method according to claim 1, wherein to generate the input vector, the data signal is pre-processed whereby the data signal is divided into predetermined time periods, and at least one of the steps of:

determining discrete-time data points by sampling from the data signal, reducing a noise signal superimposed on the data signal, and transforming the data signal into a frequency range by transformation.

5. The method according to claim 4, wherein at least one of a mean value, a maximum value, a minimum value, a gradient and turning point of the data signal is determined during the pre-processing of the data signal in at least one of a time range for the data signal and for at least one time period of the data signal.

6. The method according to claim 4, wherein at least one of an average frequency, a maximum frequency, a minimum frequency and a number of frequency peaks is determined during the pre-processing of the data signal in the frequency range for at least one of the frequency signal and predetermined frequency blocks.

7. The method according to claim 4, wherein a data content is reduced during the pre-processing of the data signal and wherein at least one of a reduced-data sequence of the data points and other data information obtained during the pre-processing is used as the input vector for the decision tree.

8. The method according to claim 1, wherein for the provision of the optimized decision tree, a feature vector is calculated which is determined from at least one of training data and a set of parameters.

9. The method according to claim 8, wherein the set of parameters contains parameters which are for a generation of the feature vector and include at least one of:
- a number of maximum, minimum or mean value of the data signal in a time range or in a frequency range;
- a length of a data portion used for analysis;
- a number of data points obtained by sampling within a data portion;
- a number and width of frequency blocks for a predetermined time period of the data signal;
- a number of frequency peaks used within the corresponding frequency block; and
- an extent of tea noise suppression.

10. The method according to claim 8, wherein a physical variable of the component or system to be investigated is measured for a provision of the training data, and a predetermined number of data points is generated by sampling from the data signal, determined thus, for a predetermined time period, which data points form a time-dependent sequence of data points to generate the feature vector.

11. The method according to claim 8, wherein random values are established for the set of parameters and in that, using the training data and the set of parameters, an increasingly optimized feature vector is calculated iteratively until an error in the optimized decision tree falls below a predetermined threshold value.

12. The method according to claim 1, wherein the decision tree is calculated using at least one of an ID3 algorithm and C4.5 algorithm, the feature vector which is calculated and optimized during the optimization of a set of parameters being used as the input vector to determine the decision tree.

13. A device for monitoring of a component or system of an aircraft or spacecraft, comprising:
- a measuring device configured to measure a physical variable at one of the component and system in order to generate a time-dependent sequence of data points of a data signal, and to provide an input vector derived from the data signal received from a sensor that monitors the component or system of the aircraft or spacecraft;
- a memory in which at least one time-dependent sequence of data points of the data signal is stored;
- a logic-arithmetic and evaluation device configured to generate an optimized decision tree using at least one time-dependent sequence of the data points and to perform a condition monitoring using the decision tree, nodes of the decision tree having attributes of the respective input vector, leaves of the decision tree each having a classification function and associated connections of which between the nodes of the decision tree being weighted,
- wherein the condition monitoring is implemented based on an evaluation of the data signal stored in the memory, in which a condition of the component or system is determined using the weighted decision tree and on the basis of the attributes of the input vector, in that an item of information concerning which of the classification functions of the decision tree best corresponds to the input vector based on the weighted decision tree, and
- wherein a probability of an applicability of the corresponding classification function is calculated for each leaf of the weighted decision tree, and a result stating the probability is delivered at an output of the weighted decision tree that corresponds to the leaf of the weighted decision tree.

14. The device according to claim 13, wherein the device is configured as an electronic oscillation measuring box which has an interface by which the oscillation measuring box is attached to the component or system to be investigated and which is also configured to pick up, by the measuring device, oscillations which are transmitted from the component or system onto the oscillation measuring box and to evaluate the oscillations by the logic-arithmetic and evaluation device.

15. A non-transitory computer-readable storage medium with a computer-executable instructions stored thereon, wherein a microprocessor performs the instructions to:
- generate an optimized decision tree, using the computer, nodes of which contain attributes of a respective input vector, leaves of which each contains a classification function and associated connections of which between the nodes of the decision tree are weighted;
- provide the input vector which is derived from a data signal received from a sensor that monitors the component or system of the aircraft or spacecraft;
- store the data signal received from the sensor in a memory for subsequent retrieval for evaluation;
- implement a condition monitoring, using the computer, based on the evaluation of the data signal stored in the memory, in which a condition of the component or system is determined using the weighted decision tree and on the basis of the attributes of the input vector, in that an item of information concerning which of the classification functions of the decision tree best corresponds to the input vector based on the weighted decision tree, is calculated and output;
- calculate, using the computer, a probability of an applicability of the corresponding classification function for each leaf of the weighted decision tree; and
- deliver, using the computer, a result stating the probability at an output of the weighted decision tree that corresponds to the leaf of the weighted decision tree,
- wherein the data signal is determined by at least one of a continuous-time and discrete-time measurement of a physical variable at the component or system.

* * * * *